United States Patent

[11] 3,593,183

[72] Inventors Svyatoslav Anatolievich Kravchenko
Kirovsky prospekt, 65, kv. 29;
Evgeny Dmitrievich Koltik, B.
Porokhovskaya ul. 54, korp kv. 77, both of
Leningrad, U.S.S.R.

[21] Appl. No. 750,139
[22] Filed Aug. 5, 1968
[45] Patented July 13, 1971

[54] VERY LOW AND LOW FREQUENCY PRECISION PHASE CALIBRATOR
2 Claims, 2 Drawing Figs.

[52] U.S. Cl. .......... 331/38, 331/44, 331/45
[51] Int. Cl. .......... H03b 21/02, H03b 27/00
[50] Field of Search .......... 331/37, 38, 45, 44

[56] References Cited

UNITED STATES PATENTS

| | | | |
|---|---|---|---|
| 2,920,284 | 1/1960 | Beagles et al. .......... | 331/38 |
| 3,379,992 | 4/1968 | Hoo .......... | 331/38 X |
| 3,212,024 | 10/1965 | King, Jr. .......... | 331/38 X |

*Primary Examiner*—Roy Lake
*Assistant Examiner*—Siegfried H. Grimm
*Attorney*—Waters, Roditi, Schwartz & Nissen

ABSTRACT: A precision phase calibrator for reproducing two sinewave signals with preset phase relations in the very low and low frequency range by using one master oscillator and connecting into a two-channel circuit at least one phase shifter at the input of frequency dividers connected at the input of two mixers.

VERY LOW AND LOW FREQUENCY PRECISION PHASE CALIBRATOR

The present invention relates to measuring instruments. More specifically, it relates to very low and low frequency (VLF and LF) precision phase calibrators.

In known arrangements, a VLF-LF precision phase calibrator comprises a master oscillator feeding a variable and a constant phase network each employing series connected frequency dividers and attenuators, and a phase shifter connected to the input of the frequency divider in the variable phase network and coupled to the master oscillator.

A drawback of known VLF-LF precision phase calibrators is the limited range of working frequencies and a low frequency stability.

An object of this invention is to provide a VLF-LF precision phase calibrator having a frequency range extended towards very low frequencies at a very high frequency stability.

The invention consists in that in a VLF-LF precision phase calibrator comprising a master oscillator which feeds a variable and a constant phase network each containing frequency dividers and at least one phase shifter placed at the input of the frequency divider in the variable phase network and coupled to the master oscillator, there is provided, according to the invention, at the output of the frequency divider in each network a mixer coupled to the master oscillator via a frequency box which provides a spectrum of frequencies coherent with that of the master oscillator.

Figure 1:
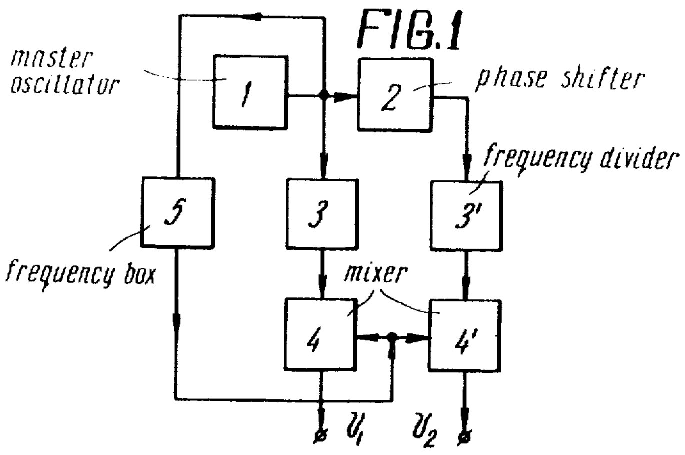
Figure 2:
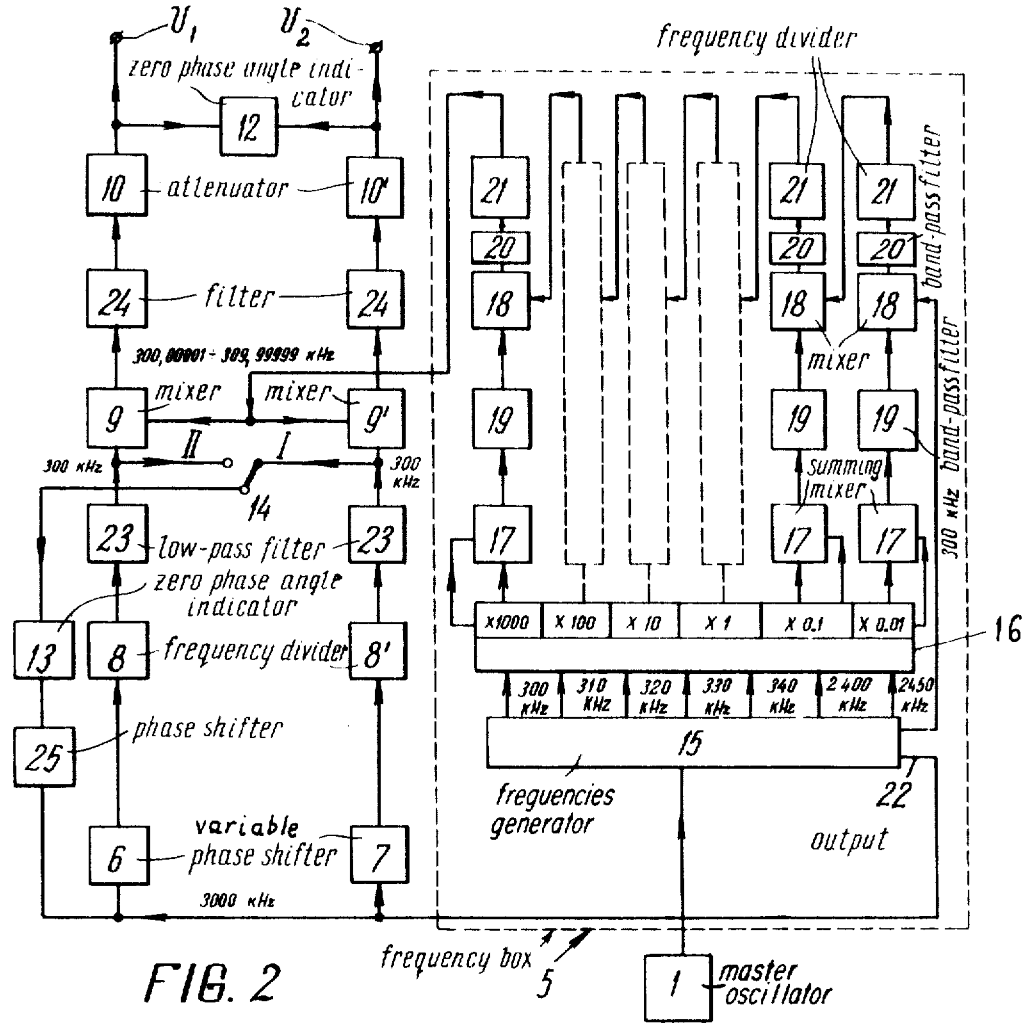

The invention itself will be best understood from the following description of a specific embodiment when read in connection with the accompanying drawings, in which:

FIG. 1 is a block diagram of the phase calibrator according to the present invention; and FIG. 2 is a detailed functional diagram of the phase calibrator according to the invention.

Referring now to the drawings, and to FIG. 1 in particular, the precision phase calibrator incorporates a master oscillator 1 which feeds a variable phase and a constant phase network, and a phase shifter 2 coupled to the master oscillator 1.

The constant and variable phase networks each comprise a frequency divider 3 (3'). The phase shifter 2 is connected to the input of the frequency divider 3' in the variable phase network.

Each network also contains a mixer 4 (4') connected via a frequency box 5 to the master oscillator 1. The frequency box 5 provides a spectrum of coherent frequencies in steps equal to the lowest value of very low frequency.

The following description will be concerned with operation of the phase calibrator in the frequency range from 0.01 c./s. to 9.99999 kc./s.

Referring to FIG. 2, the frequency box 5 in the phase calibrator is connected to the main and the auxiliary phase shifters 6 and 7 respectively. The constant and variable phase networks contain each a frequency divider 8 (8') and a mixer 9 (9') connected in series. The common input of the mixers 9 (9') is connected to the output of the frequency box 5. There are provided attenuators 10 and 10' to control output voltages. Between output terminals $V_1$ and $V_2$ is placed a zero phase angle indicator 12 to assist in setting a zero phase shift in adjustment by means of the main phase shifter 6. Another zero phase angle indicator 13 is placed between the inputs of the phase shifters 6 and 7 with a switch 14 by which this zero phase angle indicator can be connected to the output of the frequency divider 8 or 8'.

The frequency box 5 comprises a reference generator 15 producing a plurality of reference frequencies from one input frequency and is connected to the master oscillator 1, an electronic commutator 16, and commutator selected decade frequency changers with which the desired frequency is obtained. Each frequency changer comprises mixers 17 and 18, band-pass filters 19 and 20, and a frequency divider 21.

The operation of the phase calibrator is as follows.

The master oscillator 1 feeds a voltage at 1 mc./s. to the reference frequencies generator 15 which produces five reference frequencies, two auxiliary frequencies 2,400 and 2,450 kc./s., and frequency 3,000 kc./s. which is taken from the output 22 to the phase shifters 6 and 7. The reference frequencies have the values of 300, 310, 320, 330 and 340 kc./s., that is, with a 10 kc. spacing. The reference frequencies are all coherent, since they are generated by the same reference frequencies generator. The auxiliary frequencies 2,400 and 2,450 kc./s., and also the reference frequencies are fed to the electronic commutator 16. The electronic commutator 16 relays the reference and auxiliary frequencies to the input of summing mixers 17, then to the band-pass filters 19 having a pass band from 2,700 to 2,790 kc./s. The band-pass filters 20 have a pass band from 3,000 to 3,090 kc./s. The electronic commutator 16 can connect to each of the six identical frequency changers two frequencies at a time, one of the two auxiliary frequencies and one of the five reference frequencies. By means of the frequency changers, the frequency box 5 delivers at its output signal voltages in the frequency range from 300 to 309.99999 kc./s. with a minimum spacing of 0.01 c./s. The frequency separation varies from changer to changer and is indicated on the commutator 16 by the multiples from ×0.01 to ×1,000.

To provide a better insight in the operation of the frequency box 5, we shall consider frequency division by reference to the first frequency changer, that is, the decade with the ×0.01 c./s. frequency spacing. Assume that all the five reference frequencies 300—340 kc./s. are fed consecutively to the summing mixer 17 along with one auxiliary frequency 2,400 kc./s. On combining them, the output of the mixer 17 will contain frequencies from 2,700 kc./s. spaced 10 kc./s. apart. When the other auxiliary frequency 2,450 kc./s. and the same reference frequencies are fed to the mixer 17, its output will contain additional frequencies from 2,750 to 2,790 kc./s., also spaced 10 kc. apart. The band-pass filter 19 has a pass band of 100 kc./s. with a center frequency of 2,750 kc./s. Thus, it will pass frequencies from 2,700 to 2,790 kc. spaced 10 kc./s. apart. In the summing mixer 18 these frequencies are combined with the fixed 300 kc. frequency fed from the reference oscillator 15. The band-pass filter 20 transmits frequencies from 3,00 to 3,090 kc./s. The signals emerging from the frequency divider 21 have frequencies from 300 to 309 kc./s. spaced 1 kc./s. apart. As the signals pass from the outputs of the frequency dividers 21 in the remaining decades to the summing mixers 18 of each next frequency changer, they remain at the same frequency of 300 kc., but the frequency separation progressively decreases in each frequency changer by a factor of 10. At the output of the frequency divider with the ×1 kc./s. frequency separation the signals lie in a spectrum of coherent frequencies extending from 300 to 309.99999 kc./s., or more accurately, from 300.00001 to 309.99999 kc./s. in steps of 0.01 c./s.

The 3,000 kc. signal from the phase shifters 6 and 7 is fed to the 1:10 frequency dividers 8 and 8'. Provision of the 1:10 dividers 8 and 8' reduces the phase error of the phase shifters 6 and 7 to one-tenth. The low-pass filters 23 select sinewave signals. In order to obtain output signals $V_1$ and $V_2$ at frequencies from 0.01 c./s. to 9.99999 kc./s., the variable phase voltages taken from the outputs of the filters 23 are applied to the inputs of the mixers 9 and 9', whose other inputs are fed with signals at a frequency variable from 300.00001 to 309.99999 kc./s. The filters 24 attenuate all frequencies above 50 kc./s. and transmit signals at frequencies from 0.01 to 9,999.99 c./s.

The desired phase shift between the output voltages is set as follows.

The phase shifter 7 is set to zero on both the coarse and fine dials. The phase shifter 6 is so adjusted as to obtain a zero phase shift between the output voltages $V_1$ and $V_2$, which is then verified by the second zero phase angle indicator 13 which depends for its operation on multiple Lissajous figures. An advantage of this type of phase angle indicator is single-channel design which prevents phase errors due to likely phase discrepancies between the channels. When the switch 14 is in position 1, the Lissajous figures are reduced to a sinusoid by means of the phase shifter 25 with an adjustment range of $\pm(360/2n)$, where $n$ is the frequency division factor. Then the switch 14 is set to position II, and a similar Lissajous figure is obtained by small adjustment of the phase shifter 6. In this position the phase angle indicator 12 still reads a zero shift between the voltages $V_1$ and $V_2$. This is owing to the fact that the sensitivity of the phase angle indicator 12 is of the order of 0.01° to 0.02°, so that the error at 3 mc./s. is 0.1° to 0.2°, which is further reduced by the phase angle indicator 13 to a value of the order of 0.02° to 0.03°.

The desired phase shift between the output voltages $V_1$ and $V_2$ is set by rotation of the movable contact arm of the phase shifter 7, and so the shift values are shown on the dials (coarse and fine) mounted on the phase shifter 7. Alongside with the high accuracy of the proposed device (from a few tenths to a few hundredths of one degree), a sufficiently continuous adjustment of the phase shift at the output of the precision phase calibrator is ensured by provision of a reduction gear unit (omitted in the drawing) with a high gear ratio in the phase shifter 7, on the one hand, and by provision of the frequency dividers 8, on the other.

While the invention has been illustrated and described in connection with a preferable embodiment, it is not intended to be limited to the details shown, since various modifications and adaptations may be made without departing in any way from the spirit and scope of the present invention, which will be readily comprehended by those skilled in the field.

Such modifications and adaptations should be and are intended to be comprehended within the meaning and range of equivalence of the present invention as set forth in the following claims.

We claim:

1. A very low and low frequency precision phase calibrator comprising, in combination, a master oscillator for producing a signal with a master frequency; a constant phase network; a frequency divider in said constant phase network; a variable phase network; a frequency divider in said variable phase network; both of said networks being coupled to and fed by said master oscillator; at least one phase shifter connected to the input of said frequency divider in said variable phase network and connected to said master oscillator; two mixers each connected to the output of a respective frequency divider; and a frequency box connected to the output of said master oscillator and to the inputs of said mixers for providing a spectrum of frequencies coherent with the frequency of said master oscillator.

2. A calibrator as claimed in claim 1 wherein said frequency box comprises a reference frequencies generator coupled to said master oscillator and decade frequency changers coupled to said reference frequencies generator.